United States Patent Office 3,423,361
Patented Jan. 21, 1969

3,423,361
METHOD OF MANUFACTURE OF HIGH MOLECULAR WEIGHT THERMOPLASTIC SILICIC ACID POLYESTERS
Hans-Joachim Kotzsch, Rheinfelden, annd Roshdy M. Ismail, Spich, Germany, assignors to Dynamit Nobel Aktiengesellschaft, a corporation of Germany
No Drawing. Filed Sept. 11, 1967, Ser. No. 666,913
Claims priority, application Germany, Sept. 14, 1966, D 51,090
U.S. Cl. 260—47
Int. Cl. C08g 31/02
14 Claims

ABSTRACT OF THE DISCLOSURE

A process is disclosed for the production of high molecular weight thermoplastic silicic acid polyesters having the formula:

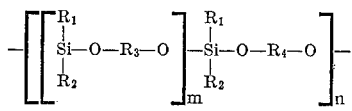

wherein $R_1$ is aryl, $R_2$ is hydrogen, aryl, alkyl or alkenyl, $R_3$ is arylene, $R_4$ is alkylene, cycloalkylene or arylene, $m$ is a whole number of from 1 to 100 and $n$ is a whole number of from 1 to 200. In accordance with the invention a silicic acid ester silazane having the formula:

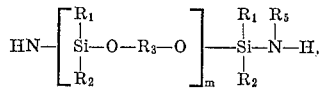

wherein $m$, $R_1$, $R_2$ and $R_3$ are as above defined and $R_5$ is hydrogen, alkyl, cycloalkyl or aryl, is reacted with an equimolar amount of a dihydroxy compound having the formula:

wherein $R_4$ is as above defined at a temperature of from 20 to 440° C.

The resulting polyesters are characterized by their high thermostabilities and are suitable for use as varnishes, coatings, injection molding, pressing and casting compounds, etc.

---

This invention relates to the production of thermoplastic silicic acid polyesters.

More particularly it relates to the production of high molecular weight thermoplastic silicic acid polyesters having the following formula:

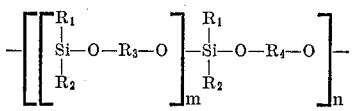

wherein $R_1$ is aryl, $R_2$ is hydrogen, alkyl, alkenyl or aryl, $R_3$ is arylene, $R_4$ is alkylene, cycloalkylene or arylene, the latter groups can also contain hetero atoms, $m$ is a whole number of from 1 to 100, preferably 1 to 50, and $n$ is a whole number of from 1 to 200, preferably 2 to 100.

It is known to manufacture silicic acid polyesters by the condensation of equimolar quantities of diphenyldichlorosilane or methylphenyldichlorosilane with bivalent phenols in the presence of basic hydrogen chloride acceptors, and, if desired, solvents. The known process, however, has the disadvantage that residues of hydrolyzable chlorine remain in the product, and this is true even when the reaction is carried out in the presence of basic catalysts.

It is also known to condense hexaphenylcyclotrisilazane or di-(phenylamino)-diphenylsilane under reduced pressure at elevated temperature with aromatic or aliphatic dihydroxy compounds, but the comparatively high molecular weight of the resulting condensation product is a serious disadvantage with respect to the processing and further use thereof. Furthermore, the manufacture and purification of the monomeric silizanes required as starting materials involve considerable expenditures of time and money.

Now it has been discovered that thermoplastic silicic acid polyesters of high molecular weight having the above formula can be simply and smoothly obtained by reacting a silicic acid ester silazane of the formula:

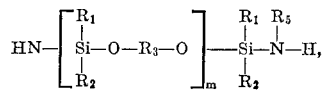

wherein $m$, $R_1$, $R_2$ and $R_3$ are as above defined and $R_5$ is hydrogen, alkyl, cycloalkyl or aryl, with an equimolar amount of a compound of the formula:

wherein $R_4$ is as above defined at a temperature of from 20 to 440 C., preferably 200 to 400° C., preferably under reduced pressure and if desired or advantageous in the presence of regulators and/or condensation catalysts. Furthermore, it is preferable to use temperatures which are above the softening point of the starting products.

The process according to the invention results in products which have higher molecular weights than those made by known processes and consequently have better mechanical properties and are free from hydrolyzable silicon-chlorine bonds.

The silicic acid ester silazanes used as starting products can be prepared by a process, which is not claimed here and which comprises condensing a bivalent phenol with an excess of an aryl dihalogen silane such as diphenyldichlorosilane, hydrogen phenyldichlorosilane, phenylvinyldichlorosilane, or an aryl dichlorosilane, which may be alkyl-substituted such as a di-(4-methylphenyl)-dichlorosilane, or mixtures thereof, in various stoichiometric ratios in the presence of amine catalysts or in the presence of organic hydrogen halide binding agents, followed by exchanging amino, alkyl, cycloalkyl or arylamino groups for the residual hydrolyzable chlorine by reaction with an excess of ammonia and/or primary, cycloaliphatic or aromatic amines possibly in the presence of inert solvents at 20 to 180° C.

In accordance with the invention the silicic acid ester silazanes are reacted with a compound HO—$R_4$—OH to form the thermoplastic silicic acid polyester. Suitable instances of dihydroxy compounds for the condensation reaction include the following:

(1) Diols which are derived from aliphatic linear, monomeric and polymeric compounds, and from cycloaliphatic compounds and can include polyethers and polyesters having terminal hydroxyl groups, such as for example ethylene glycol, 1,2- and 1,3-propylene glycol, 1,4-butanediol, 1,4-butenediol, 1,4-butinediol, 1,5-pentenediol, 1,6-hexanediol, 1,4-cyclohexanediol, diethylene glycol, triethylene glycol, polyethylene glycols having molecular weights up to 5000, reaction products formed from dimethylterephthalate and stoichiometrically excessive amounts of glycols or polyglycols and the like.

(2) Bivalent phenols, such as:
resorcinol,
hydroquinone,
bis-(2-hydroxyphenyl)-methane,
bis-(4-hydroxyphenyl)-methane,
bis-(4-hydroxy-3-methyl-phenyl)-methane,
bis-(4-hydroxy-3,5-dichlorophenyl)-methane,
bis-(4-hydroxy-3,5-dibromophenyl)-methane, bis-(4-hydroxy-3,5-difluorophenyl)-methane,
1,1-bis-(4-hydroxyphenyl)-ether,
2,2-bis-(4-hydroxyphenyl)-propane,
2,2-bis-(3-hydroxyphenyl)-propane,
2,2-bis-(4-hydroxyphenyl)-butane,
2,2-bis-(4-hydroxyphenyl)-4-(methyl)-pentane,
2,2-bis-(4-hydroxy-3-methylphenyl)-propane,
2,2-bis-(4-hydroxy-3-chlorophenyl)-propane,
2,2-bis-(4-hydroxy-3,5-dichlorophenyl)-propane,
2,2-bis-(4-hydroxy-3,5-dibromophenyl)-propane,
bis-(4-hydroxyphenyl)-phenylmethane,
bis-(4-hydroxyphenyl)-phenylmethylmethane,
bis-(4-hydroxyphenyl)-diphenylmethane,
bis-(4-hydroxyphenyl)-(4-methylphenyl)-methane,
1,1-bis-(4-hydroxyphenyl)-1-(3-methylphenyl)-propane,
1,1-bis-(4-hydroxyphenyl)-2,2,2-trichloroethane,
bis-(4-hydroxyphenyl)-(4-chlorophenyl)-methane,
1,1-bis-(4-hydroxyphenyl)-cyclohexane,
bis-(4-hydroxyphenyl)-cyclohexylmethane,
4,4'-dihydroxydiphenyl,
3,3',5,5'-tetramethyl-4,4'-dihydroxydiphenyl,
dihydroxynaphthaline,
4,4'-dihydroxydiphenylsulfone,
4,4-dihydroxydiphenylether,
4,4'-dihydroxybenzophenone and the like.

(3) Hetero-organic compounds having 2 hydroxy groups, such as silane diols and siloxane diols, as for example, dihydroxypolydimethylsiloxane, α,ω - di - (3-hydroxypropyl) - dimethyldisiloxane, their corresponding polysiloxanes and the like.

Mixtures of the above-named bivalent hydroxy compounds can also be used.

The silicic acid ester silazanes are reacted with the dihydroxy compounds in equimolar amounts, it being possible to use compounds having one hydroxyl group as regulators, if desired, to control the molecular weight. The following compounds, among others, are suitable for use as regulators: ethanol, isopropanol, n-octanol, 2-alkoxyethanol, benzyl alcohol, cinnamic alcohol, phenol, 2,4,6-tri-tert·butylphenol, etc. The amount of the regulator use is determined by the desired molecular weight of the resulting silicic acid polyester.

Condensation catalysts which are suitable for use in the present invention are the hydrides, amides and salts of organic acids, alcoholates and phenolates of alkali metals and/or alkaline earth metals. The catalysts can be used in quantities of 0.1 to 10 mole percent, preferable 1 to 3 mole percent with reference to the quantity of silicic acid ester silazane. However, the reaction takes place sufficiently rapidly without the addition of any catalyst.

The reaction can also be carried out in an inert solvent. Suitable inert solvents for use in the reaction of the present invention include both aliphatic and aromatic hydrocarbons as well as simple and cyclic ethers. Instances of suitable aliphatic hydrocarbons include both homogeneous and mixed compounds, such as isooctane and benzine fractions, as for example those fractions having a boiling range from 120 to 180° C. Benzene, toluene and xylene are examples of aromatic hydrocarbons which can be advantageously employed as inert solvents. Ethers that can be used as solvents in the reaction include for example, diisopropyl ethers, diisoamyl ethers, diphenyl ethers, 1,4-dioxane, and others. The above listing of suitable ethers indicates that aliphatic and aromatic, openchain and cyclic ethers can all be used.

The special advantage of the process of the invention lies in the small quantity of amines or ammonia, which are split off in the reaction. The small amounts can be removed relatively quickly and easily. Thus the possibility is created of producing in a simple and controllable manner silicic acid polyesters of high molecular weight, and especially silicic acid polycoesters having periodically alternating segments, while the properties can be varied to a great extent by the selection of the dihydroxy compounds.

The silicic acid polyester polymers are characterized by their high thermostability and can be used, for example, as varnishes, coatings, insulating injection-molding compounds and pressing compounds, high-temperature thermoplastics, and casting resins. They can also advantageously be used in combination with other suitable thermoplastics and with fillers, pigments and dyes.

The following examples serve to illustrate the invention but in no wise to be considered as restricting the same.

EXAMPLE 1

(a) Manufacture of the starting material 1.05 mole of diphenyldichlorosilane and 1 mole of 2,2-(4-hydroxyphenyl)-propane were boiled in 600 ml. of anhydrous toluene for 10 hours in the presence of 0.5 ml. of dimethylaniline, with refluxing, until the evolution of HCl had been completed. After 10 hours, 2 moles of HCl had been split off and the reaction thus came to an end. The preliminary condensation product was transferred into a 2-liter glass autoclave provided with a glandless agitator and a jacket through which heating and cooling liquid could be circulated. Thereafter, at an internal temperature of 30° C. and 1200 r.p.m. agitator speed, 8 grams of liquid ammonia were added drop by drop within 15 minutes from a pressure buret. Ammonium chloride was thereby immediately separated out. The internal temperature rose only slightly; the maximum pressure amounted to 2.6 atmospheres. The mixture was heated for one hour at 60° C., while a final pressure of 2 atmospheres was established. Following cooling, venting of the pressure and scavenging with nitrogen, the ammonium chloride was removed by suction filtration and the resulting filtrate concentrated by evaporation. In this manner 406 grams of diphenylsilazane dianyl ester were isolated, having a molecular weight of 8300 as determined by vapor pressure osmometry.

(b) Manufacture of the polyester 42 g. of the above diphenylsilazane dianyl ester, which had a nitrogen content amounting to 0.32% was mixed in a finely granular form with 570 mg. of Bisphenol A and 1 mg. of the dipotassium salt of Bisphenol A. Following complete fusion at 200° C. the mixture was heated for 30 minutes at 350° C. under a vacuum of 1 mm. Hg, whereupon the mixture solidified. The glassy, light yellow polymer softened at 310–320° C. and had a reduced viscosity of 1.0 (measured in a dimethyl formamide solution of 0.5 weight percent at 25° C.). Thermographometric analysis showed weight loss beginning at 515° C.

EXAMPLE 2

46. g. of diphenylsilazane resorcyl ester, which was manufactured as in Example 1a, dichlorosilane and resorcinol employed in a molar ratio of 0.8:0.75, and having a molecular weight determined by vapor pressure osmometry of 4500 and a nitrogen content of 0.6% was fused together with 73 mg. of 1,6-hexanediol and heated for 40 minutes at a vacuum of 1 mm. Hg at 280° C., whereupon the mixture hardened to a glassy substance. The polymer did not soften below 400° C., but was soluble in dimethylformamide. It had a reduced viscosity of 0.7 (measured as a solution of 0.5% by weight at 25° C.).

EXAMPLE 3

18.8 g. of N-methyldiphenylsilazane dianyl ester having a molecular weight of 1920, manufactured as in Example 1a by a reaction of dichlorosilane and diane in a molar ratio of 5:4 (the residual chlorine being replaced by methyl amine instead of ammonia), and having a nitrogen content of 1.48% was melted together with 3.7 g. of p,p'-diphenol and 1 mg. of calcium hydride and the mixture heated for 30 minutes at 350° C. and 1 mm. Hg. The tough, hard polymer softened at 320 to 340°

C. and had a reduced viscosity of 0.9 in dimethylformamide (measured in a solution of 0.5% by weight at 25° C.). Thermographometric analysis showed a weight loss beginning at 540° C.

We claim:
1. A method of preparing a higher molecular weight thermoplastic silicic acid polyester of the formula:

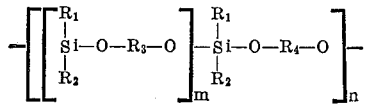

wherein $R_1$ is aryl, $R_2$ is selected from the group consisting of hydrogen, aryl, alkyl, and alkenyl, $R_3$ is arylene, $R_4$ is a member selected from the group consisting of alkylene, cycloalkylene, arylene and such groups containing hetero atoms, $m$ is a whole number of from 1 to 100 and $n$ is a whole number of from 1 to 200, which comprises reacting a silicic acid ester silazane corresponding to the formula:

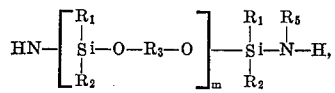

wherein $R_1$, $R_2$, $R_3$ and $m$ are as above defined and $R_5$ is a member selected from the group consisting of hydrogen, alkyl, cycloalkyl and aryl with an equimolar amount of a compound corresponding to the formula:

wherein $R_4$ is as above defined at a temperature of from about 20° C. to about 400° C.

2. A method according to claim 1 which comprises effecting said reaction at a temperature of from about 200–400° C.

3. A method according to claim 1 which comprises effecting said reaction in the presence of a condensation catalyst selected from the group consisting of alkali metal and alkaline earth metal hydrides, amides, alcoholates, phenolates and salts of organic acids.

4. A method according to claim 3 which comprises utilizing said catalyst in an amount of from 0.1 to 10 mol percent referred to said silicic acid ester silazane.

5. A method according to claim 1 which comprises effecting said reaction in the additional presence of a member selected from the group consisting of aliphatic and aromatic compounds containing one hydroxyl group.

6. A method according to claim 5 wherein said compound containing one hydroxyl group is a member selected from the group consisting of ethanol, isopropanol, n-octanol, 2-alkoxy-ethanol, benzyl alcohol, cinnamic alcohol, phenol and 2,4,6-tri-tert.butylphenol.

7. A method according to claim 1 which comprises effecting said reaction in the presence of a condensation catalyst selected from the group consisting of alkali metal and alkaline earth metal hydrides, amides, alcoholates, phenolates and salts or organic acids, and a compound selected from the group consisting of ethanol, isopropanol, n-octanol, 2-alkoxy-ethanol, benzyl alcohol, cinnamic alcohol, phenol and 2,4,6-tri-tert.butylphenol.

8. A method according to claim 1 wherein $m$ is a whole number from 1 to 50.

9. A method according to claim 1 wherein $n$ is a whole number from 2 to 100.

10. A method according to claim 1 wherein said silicic acid ester silazane is obtained by condensing an aryl dihalogen silane with a bivalent phenol in the presence of an organic hydrogen halide binding agent and thereafter reacting the preliminary condensation product thereby obtained with an excess of at least one member selected from the group consisting of ammonia, and primary cycloaliphatic and aromatic amines.

11. A method according to claim 1 wherein said compound HO—$R_4$—OH is a member selected from the group consisting of linear aliphatic and cycloaliphatic diols.

12. A method according to claim 1 wherein said silicic acid ester silazane is diphenylsilazanedianyl ester and said compound HO—$R_4$—OH is Bisphenol A.

13. A method according to claim 1 wherein said silicic acid ester silazane is diphenylsilazane resorcyl ester and said compound HO—$R_4$—OH is 1,6-hexanediol.

14. A method according to claim 1 wherein said silicic acid ester silazane is N-methyldiphenylsilazane dianylester and said compound HO—$R_4$—OH is p,p'-diphenol.

References Cited

UNITED STATES PATENTS 3,043,798   7/1962   Boyer et al. _____ 260—46.5
3,346,515   10/1967  Curry _____ 260—2

WILLIAM H. SHORT, *Primary Examiner.*

M. GOLDSTEIN, *Assistant Examiner.*

U.S. Cl. X.R.

260—32.6, 46.5